(12) United States Patent
Matsuda et al.

(10) Patent No.: US 10,852,899 B2
(45) Date of Patent: Dec. 1, 2020

(54) NON-TRANSITORY COMPUTER-READABLE STORAGE MEDIUM, AND TERMINAL DEVICE

(71) Applicant: FUJITSU LIMITED, Kawasaki (JP)

(72) Inventors: Kouji Matsuda, Kawasaki (JP); Shinsa Igarashi, Sagamihara (JP); Masaki Katou, Fuji (JP); Saori Suzuki, Numazu (JP); Takashi Sato, Shizuoka (JP); Seiki Hamano, Yokohama (JP); Minoru Uchino, Fuji (JP)

(73) Assignee: FUJITSU LIMITED, Kawasaki (JP)

( * ) Notice: Subject to any disclaimer, the term of this patent is extended or adjusted under 35 U.S.C. 154(b) by 402 days.

(21) Appl. No.: 15/619,225

(22) Filed: Jun. 9, 2017

(65) Prior Publication Data

US 2017/0371500 A1 Dec. 28, 2017

(30) Foreign Application Priority Data

Jun. 22, 2016 (JP) ................................ 2016-123687

(51) Int. Cl.
*G06F 3/048* (2013.01)
*G06F 3/0481* (2013.01)
(Continued)

(52) U.S. Cl.
CPC .......... *G06F 3/0481* (2013.01); *G06F 3/1454* (2013.01); *G06F 9/451* (2018.02);
(Continued)

(58) Field of Classification Search
CPC ...... G06F 3/048; G06F 1/3203; G06F 3/0481; G06F 9/451; G06F 3/1454; H04L 43/10;
(Continued)

(56) References Cited

U.S. PATENT DOCUMENTS

| | | | |
|---|---|---|---|
| 9,876,859 B1* | 1/2018 | Plummer | H04L 67/143 |
| 2005/0108038 A1* | 5/2005 | Cober | G06Q 10/06 |
| | | | 705/324 |

(Continued)

FOREIGN PATENT DOCUMENTS

| | | |
|---|---|---|
| JP | 5-324559 A | 12/1993 |
| JP | 06-289984 | 10/1994 |

(Continued)

OTHER PUBLICATIONS

Japanese Office Action dated Dec. 24, 2019 for corresponding Japanese Patent Application No. 2016-123687, with English Translation, 7 pages.

*Primary Examiner* — Ting Z Lee
(74) *Attorney, Agent, or Firm* — Fujitsu Patent Center

(57) ABSTRACT

A non-transitory computer-readable storage medium storing a control program that causes a terminal device to execute a process, the terminal device being coupled to an information processing device, the process including displaying an operation screen of the information processing device on a display, determining, when an operation on the displayed operation screen is detected, whether an elapsed time after a timing of a previous operation of the operation screen has exceeded a reference time, transmitting operation information corresponding to the detected operation to the information processing device when it is determined that the elapsed time has not exceeded the reference, and when it is determined that the elapsed time has exceeded the reference, displaying, on the display, a screen that requests an input of identification information that identifies an operation-target information processing device without executing the transmitting.

10 Claims, 14 Drawing Sheets

| TYPE | ALERT TIME | CONDITION |
|---|---|---|
| Z | INFINITY | OPERATION-TARGET SCREEN IS SCREEN OTHER THAN REMOTE DESKTOP CONNECTION SCREEN |
| A | 60 MINUTES | OPERATION IS RESUMED ON SAME REMOTE DESKTOP CONNECTION SCREEN |
| B | 30 MINUTES | OPERATION IS RESUMED ON DIFFERENT REMOTE DESKTOP CONNECTION SCREEN OR PERFORMED FOR FIRST TIME |
| C1 | 10 MINUTES | OPERATION HAS BEEN PERFORMED ONCE ON SCREEN OTHER THAN REMOTE DESKTOP CONNECTION SCREEN WITHIN PERIOD FROM PREVIOUS OPERATION TO CURRENT OPERATION |
| C2 | 5 MINUTES | OPERATION HAS BEEN PERFORMED TWICE OR MORE ON SCREEN OTHER THAN REMOTE DESKTOP CONNECTION SCREEN WITHIN PERIOD FROM PREVIOUS OPERATION TO CURRENT OPERATION |

(51) Int. Cl.
  *G06F 9/451* (2018.01)
  *G06F 3/14* (2006.01)
  *G09G 5/14* (2006.01)
  *G06F 1/3203* (2019.01)
  *H04L 12/26* (2006.01)

(52) U.S. Cl.
  CPC ............ *G06F 1/3203* (2013.01); *G06F 3/048* (2013.01); *G09G 5/14* (2013.01); *G09G 2330/021* (2013.01); *G09G 2330/022* (2013.01); *G09G 2354/00* (2013.01); *G09G 2358/00* (2013.01); *H04L 43/10* (2013.01); *H04L 43/106* (2013.01)

(58) Field of Classification Search
  CPC ............ H04L 43/106; G09G 2330/021; G09G 2330/022; G09G 2354/00; G09G 5/14; G09G 2358/00
  See application file for complete search history.

(56) References Cited

U.S. PATENT DOCUMENTS

| | | | |
|---|---|---|---|
| 2006/0143706 A1* | 6/2006 | Kawasaki | G06F 21/31 726/19 |
| 2007/0130251 A1* | 6/2007 | Ohtsuka | H04L 67/08 709/203 |
| 2008/0178119 A1* | 7/2008 | Nogami | G06F 3/04847 715/810 |
| 2008/0263655 A1* | 10/2008 | Muto | G06F 21/608 726/16 |
| 2012/0179828 A1* | 7/2012 | Kobayashi | G06F 21/44 709/227 |
| 2016/0212283 A1* | 7/2016 | Sato | H04N 1/00315 |

FOREIGN PATENT DOCUMENTS

| | | |
|---|---|---|
| JP | 08-335155 | 12/1996 |
| JP | 2007-122449 A | 5/2007 |
| JP | 2011-170675 | 9/2011 |

* cited by examiner

FIG. 5

| SCREEN INFORMATION | DEVICE INFORMATION | OPERATION TIME | SCREEN POSITION | ALERT TIME |
|---|---|---|---|---|
| CURRENT OPERATION SCREEN | SERVER 3x | CURRENT TIME | COORDINATES x | TIME T x |
| SCREEN W1 | SERVER 3A | LAST OPERATION TIME T1 | COORDINATES 1 | TIME T 1 |
| SCREEN W2 | SERVER 3B | LAST OPERATION TIME T2 | COORDINATES 2 | TIME T 2 |
| ... | ... | ... | ... | ... |
| SCREEN Wn | NULL | LAST OPERATION TIME Tn | COORDINATES n | TIME T n |

FIG. 6

| TYPE | ALERT TIME | CONDITION |
|---|---|---|
| Z | INFINITY | OPERATION-TARGET SCREEN IS SCREEN OTHER THAN REMOTE DESKTOP CONNECTION SCREEN |
| A | 60 MINUTES | OPERATION IS RESUMED ON SAME REMOTE DESKTOP CONNECTION SCREEN |
| B | 30 MINUTES | OPERATION IS RESUMED ON DIFFERENT REMOTE DESKTOP CONNECTION SCREEN OR PERFORMED FOR FIRST TIME |
| C1 | 10 MINUTES | OPERATION HAS BEEN PERFORMED ONCE ON SCREEN OTHER THAN REMOTE DESKTOP CONNECTION SCREEN WITHIN PERIOD FROM PREVIOUS OPERATION TO CURRENT OPERATION |
| C2 | 5 MINUTES | OPERATION HAS BEEN PERFORMED TWICE OR MORE ON SCREEN OTHER THAN REMOTE DESKTOP CONNECTION SCREEN WITHIN PERIOD FROM PREVIOUS OPERATION TO CURRENT OPERATION |

FIG. 7

| SCREEN NAME | DEVICE INFORMATION | OPERATION TIME | SCREEN POSITION | ALERT TIME |
|---|---|---|---|---|
| SCREEN W3 | NULL | 2016/03/01 18:00 | COORDINATES 3 | INFINITY |
| SCREEN W2 | SERVER 3B | 2016/03/01 18:01 | COORDINATES 2 | 30 MINUTES |
| SCREEN W1 | SERVER 3A | 2016/03/01 18:02 | COORDINATES 1 | 30 MINUTES |

SCREEN W1 IS OPERATED AT 18:03: TYPE A
(ALERT TIME: 60 MINUTES)

SCREEN W2 IS OPERATED AT 18:03: TYPE B
(ALERT TIME: 30 MINUTES)

SCREEN W3 IS OPERATED AT 18:03: TYPE Z
(ALERT TIME: INFINITY)

FIG. 8

| SCREEN NAME | DEVICE INFORMATION | OPERATION TIME | SCREEN POSITION | ALERT TIME |
|---|---|---|---|---|
| SCREEN W2 | SERVER 3B | 2016/03/01 18:00 | COORDINATES 2 | 30 MINUTES |
| SCREEN W3 | NULL | 2016/03/01 18:01 | COORDINATES 3 | INFINITY |
| SCREEN W1 | SERVER 3A | 2016/03/01 18:02 | COORDINATES 1 | 30 MINUTES |
| SCREEN W4 | NULL | 2016/03/01 18:03 | COORDINATES 4 | INFINITY |

SCREEN W1 IS OPERATED AT 18:04: TYPE C1
(ALERT TIME: 10 MINUTES)

SCREEN W2 IS OPERATED AT 18:04: TYPE C2
(ALERT TIME: 5 MINUTES)

NON-TRANSITORY COMPUTER-READABLE STORAGE MEDIUM, AND TERMINAL DEVICE

CROSS-REFERENCE TO RELATED APPLICATION

This application is based upon and claims the benefit of priority of the prior Japanese Patent Application No. 2016-123687, filed on Jun. 22, 2016, the entire contents of which are incorporated herein by reference.

FIELD

The embodiment discussed herein is related to a non-transitory computer-readable storage medium, and a terminal device.

BACKGROUND

In recent years, there has been used a technology called remote desktop, in which a terminal device remotely operates an execution environment of a server (information processing device) connected to the terminal device. The execution environment of the server is remotely operated in such a manner that a remote desktop connection screen is displayed on a display of the terminal device and a predetermined operation is performed on the remote desktop connection screen.

As a related art, there is proposed a technology in which a display unit capable of displaying a plurality of selectable items displays a predetermined recommended item as the selectable item on a screen and then displays another item as the selectable item after a predetermined period of time has elapsed (see, for example, Japanese Laid-open Patent Publication No. 2011-170675).

Further, there is proposed a technology in which an environment configured to enable an appropriate item to be designated and input when an input operation is resumed after being suspended for a long period of time is developed in a computation control device or the like configured to designate and input items under guidance of a menu screen displayed on a display device (see, for example, Japanese Laid-open Patent Publication No. 8-335155).

Still further, there is proposed a technology in which, when an input with a pen is not detected for a predetermined period of time or longer or a wrong gesture is made, an edit menu is displayed near the position of a pen tip as a pop-up (see, for example, Japanese Laid-open Patent Publication No. 6-289984).

SUMMARY

According to an aspect of the invention, a non-transitory computer-readable storage medium storing a control program that causes a terminal device to execute a process, the terminal device being coupled to an information processing device, the process including displaying an operation screen of the information processing device on a display, determining, when an operation on the displayed operation screen is detected, whether an elapsed time after a timing of a previous operation of the operation screen has exceeded a reference time by referring to a storage unit that stores the timing of a previous operation, transmitting operation information corresponding to the detected operation to the information processing device when it is determined that the elapsed time has not exceeded the reference, and when it is determined that the elapsed time has exceeded the reference, displaying, on the display, a screen that requests an input of identification information that identifies an operation-target information processing device without executing the transmitting.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a management table;

FIG. 6 is a diagram illustrating an example of a classification table;

FIG. 7 is a diagram illustrating an example of alert time selection;

FIG. 8 is a diagram illustrating another example of the alert time selection;

DESCRIPTION OF EMBODIMENT

When a plurality of screens (windows) are displayed on a display of a terminal device, remote desktop connection screens may be included in the plurality of screens. In this case, a remote desktop connection screen which is not an operation target may be operated erroneously.

For example, when a plurality of remote desktop connection screens corresponding to different servers are displayed on the display of the terminal device, an operation intended for an operation-target remote desktop connection screen may be performed on another remote desktop connection screen. In this case, the performed operation is an erroneous operation.

The erroneous operation as described above may also occur when a single remote desktop connection screen and a screen other than the remote desktop connection screen are displayed on the display.

As one aspect, the embodiment has an object to reduce the erroneous operation on an operation screen for operating an information processing device connected to the terminal device.

Example of Overall Configuration of System of Embodiment

Figure 1:
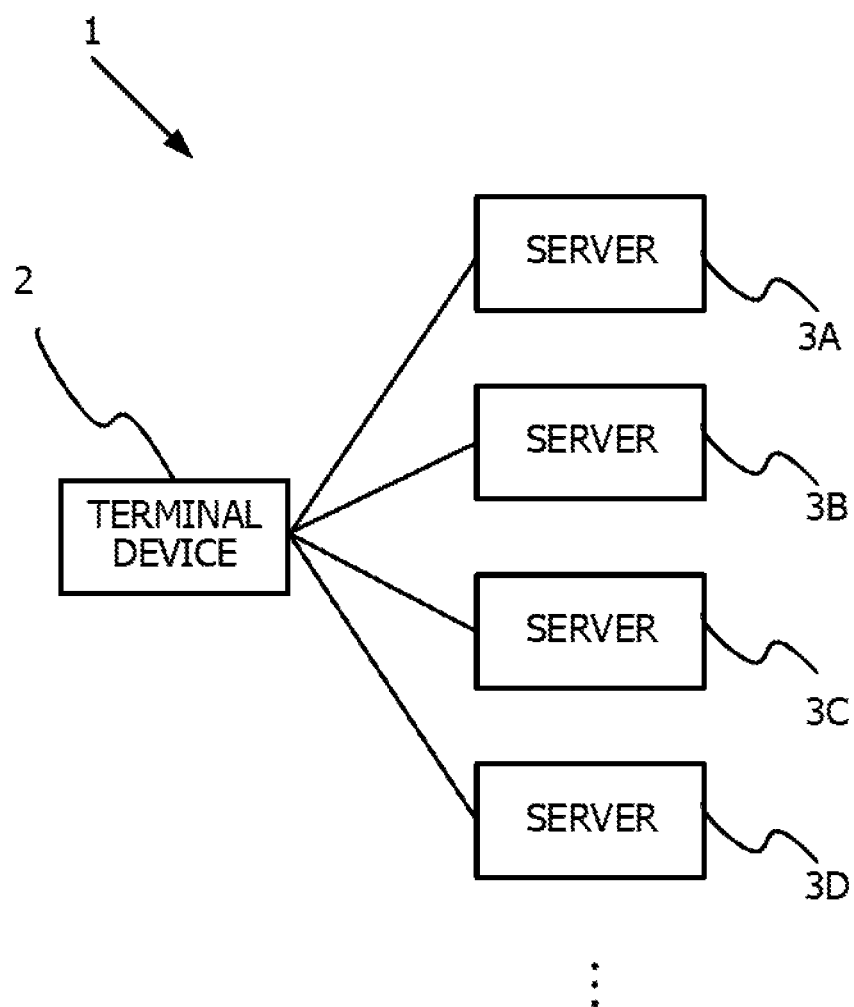
FIG. 1 is a diagram illustrating an example of the overall configuration of a system of an embodiment.

The embodiment is described below with reference to the drawings. FIG. 1 illustrates an example of the overall configuration of a system 1 of the embodiment. In the system 1, a terminal device 2 is connected to servers 3A, 3B, 3C, 3D . . . (collectively referred to as servers 3) via a network. The server 3 is an example of the information processing device.

The terminal device 2 is also referred to as a working personal computer (PC). The terminal device 2 has a function of logging in to an arbitrary server 3 and remotely operating an execution environment of the server 3 to which the terminal device 2 has logged in. This function is also referred to as a remote desktop connection function.

The terminal device 2 is capable of logging in to a plurality of servers 3 and simultaneously operating execution environments of the plurality of servers 3. In this case, screens for using the remote desktop connection function on the plurality of servers 3 (remote desktop connection screens) are displayed on a display of the terminal device 2.

<Example of Terminal Device>

Figure 2:
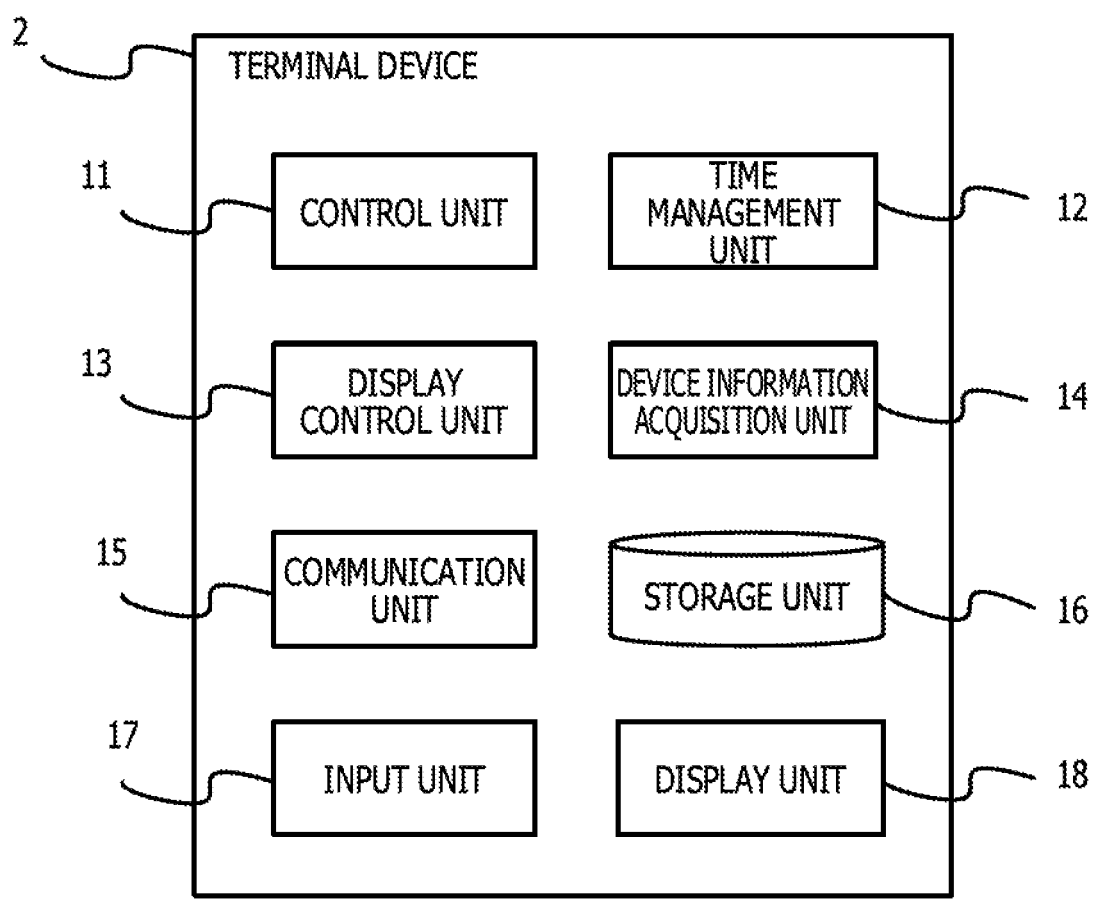
FIG. 2 is a diagram illustrating an example of a terminal device.

FIG. 2 illustrates an example of the terminal device 2. The terminal device 2 in the example of FIG. 2 includes a control unit 11, a time management unit 12, a display control unit 13, a device information acquisition unit 14, a communication unit 15, a storage unit 16, an input unit 17, and a display unit 18.

The control unit 11 performs various kinds of control on the terminal device 2. The time management unit 12 performs various kinds of processing for time management. The time management unit 12 is an example of a determination unit. The display control unit 13 performs display control on the display unit 18. The device information acquisition unit 14 performs control of acquiring device information. In the embodiment, the device is assumed to be the server 3.

Thus, the device information acquisition unit 14 performs control of acquiring information on the server 3 connected to the terminal device 2 as the device information. The device information is information that identifies the server 3, such as an Internet Protocol (IP) address or a host name.

The device information may be information other than the IP address and the host name as long as the information identifies the server 3. For example, the device information may be a media access control (MAC) address or a world wide name (WWN) address.

The communication unit 15 communicates with each server 3. The storage unit 16 stores predetermined information. The input unit 17 is, for example, a keyboard and a mouse. The display unit 18 is, for example, a display. The display unit 18 is described as a display below.

Display Example of Display Unit

Figure 3:
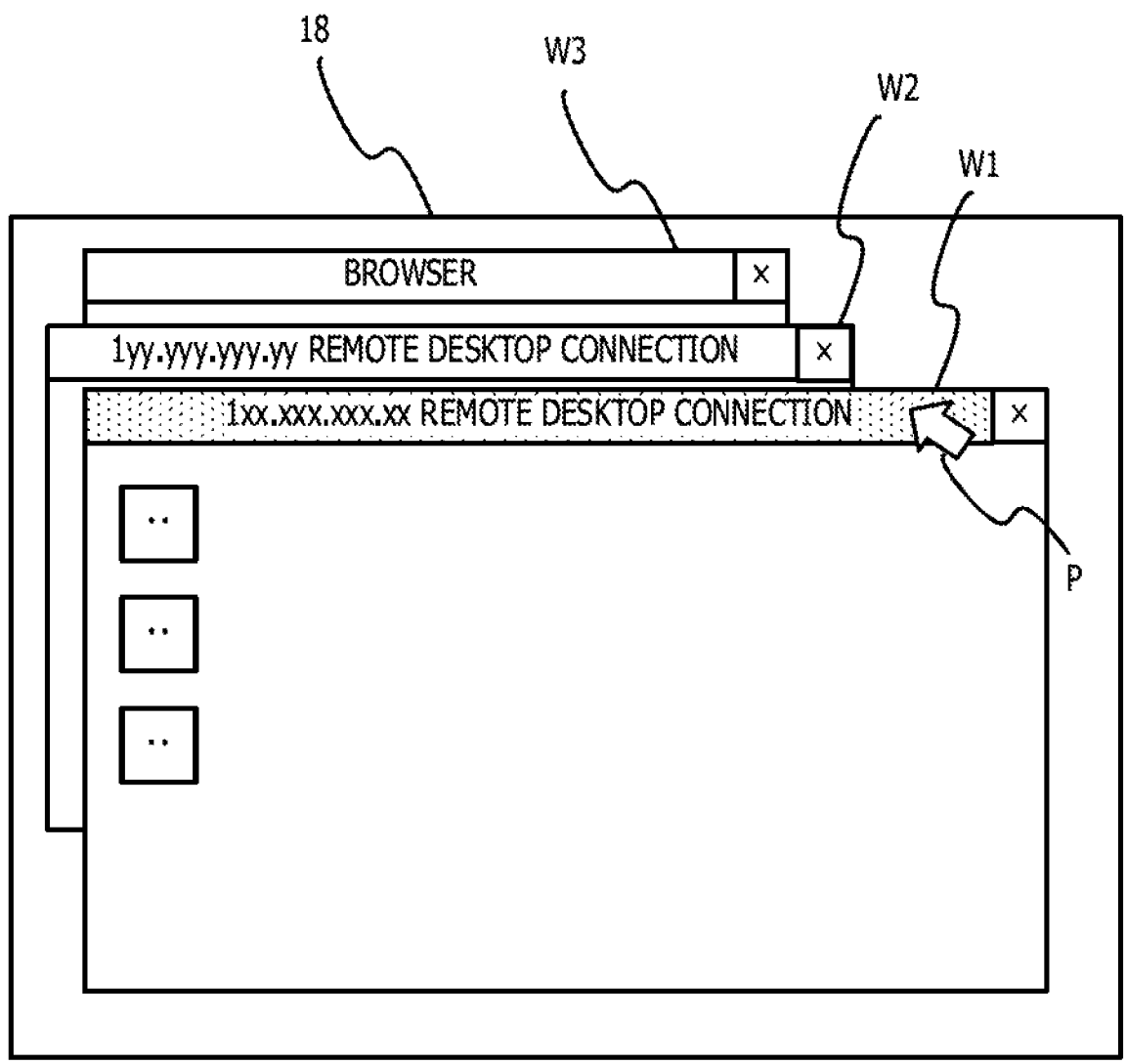
FIG. 3 is a diagram (first diagram) illustrating a display example of a display unit.

FIG. 3 illustrates a display example of the display unit 18. As described above, the display unit 18 is, for example, a display. A plurality of screens (windows) are displayed on the display unit 18. In the example of FIG. 3, three screens W1, W2, and W3 (hereinafter referred to collectively as screens W) are displayed on the display unit 18.

The screen W1 and the screen W2 are remote desktop connection screens. As described above, the remote desktop connection screen is a screen for using the remote desktop connection function. The remote desktop connection screen is an example of the operation screen or screen area.

The screen W3 is a screen other than the remote desktop connection screen. In the example of FIG. 3, the screen W3 is assumed to be a browser screen. The screen other than the remote desktop connection screen may be a screen other than the browser screen. For example, the screen other than the remote desktop connection screen may be a mailer screen for operating electronic mail.

The display control unit 13 performs control of displaying various screens including remote desktop connection screens on the display unit 18. In the example of FIG. 3, three screens are displayed on the display unit 18, but the number of screens to be displayed on the display unit 18 is not limited to three.

It is assumed that the server 3 corresponding to the remote desktop connection screen W1 and the server 3 corresponding to the remote desktop connection screen W2 are different from each other. The server 3 corresponding to the remote desktop connection screen W1 is hereinafter assumed to be the server 3A and the server 3 corresponding to the remote desktop connection screen W2 is hereinafter assumed to be the server 3B.

Identification information that identifies the corresponding server 3A is displayed on the remote desktop connection screen W1. In the example of FIG. 3, an Internet Protocol (IP) address of the corresponding server 3A is displayed on the upper part (title bar) of the remote desktop connection screen W1.

Similarly, an IP address of the server 3B is displayed on the remote desktop connection screen W2 as identification information that identifies the corresponding server 3B. The servers 3 corresponding to the remote desktop connection screen W1 and the remote desktop connection screen W2 are different from each other, and hence the displayed IP addresses are also different from each other.

In the example of FIG. 3, the screen having a shaded area in the title bar is a selected screen (active screen). In the example of FIG. 3, the remote desktop connection screen W1 is the selected screen.

For example, an operator who operates the terminal device 2 operates a mouse pointer P displayed on the display unit 18 by using the mouse serving as the input unit 18. The terminal device 2 receives this operation. For example, when the terminal device 2 has received a mouse operation for selecting the remote desktop connection screen W1, the terminal device 2 sets the remote desktop connection screen W1 to a selected state (active state).

In this case, operations on the selected remote desktop connection screen W1 are enabled. For example, when the terminal device 2 has received an operation of selecting the remote desktop connection screen W2, operations on the remote desktop connection screen W2 are enabled.

The selected screen is a screen which is an operation target. The selected screen is hereinafter referred to as an operation-target screen. For example, there is a case in which the operator may build a cluster system (including a primary server and a secondary server) by using the terminal device 2. Further, there is a case in which the operator may build a plurality of servers (including web servers and application servers) that play the same role in order to share the load.

In those cases, the remote desktop connection screens W corresponding to the respective servers 3 are displayed on the display unit 18. Thus, a plurality of remote desktop connection screens W are displayed on the display unit 18.

For example, it is assumed that the operator is performing a predetermined task on the server 3A by using the remote desktop connection screen W1. When the task on the server 3A is then suspended and is resumed, the operator may erroneously select a screen W other than the remote desktop connection screen W1.

For example, it is assumed that the browser screen W3 is selected after the task on the server 3A has been suspended. When the operator then resumes the task on the server 3A, it is conceivable that the operator may perform an operation of selecting the remote desktop connection screen W1. At this time, the operator may erroneously perform an operation of selecting the remote desktop connection screen W2.

When the IP addresses of the corresponding servers 3 are displayed on the title bars of the remote desktop connection screens W as illustrated in the example of FIG. 3, it is conceivable that the operator may select the operation-target remote desktop connection screen W based on the IP addresses.

The plurality of remote desktop connection screens W displayed on the display unit 18 may be similar to each other in many cases. As a result, the operator may perform an operation on the remote desktop connection screen W2 that is different from the intended operation-target remote desktop connection screen W1.

When the terminal device 2 has received the operation of selecting the remote desktop connection screen W2, the operations on the remote desktop connection screen W2 are enabled.

Even if the operator is not aware that the selected screen W is the remote desktop connection screen W2, the terminal device 2 receives the operation performed on the terminal device 2 as the operation on the remote desktop connection screen W2.

In this case, an operation for the server 3A is performed on the remote desktop connection screen W2 corresponding to the server 3B. This operation is an erroneous operation. The erroneous operation is more likely to occur as the information displayed on the title bar of the screen W is smaller.

Figure 4:
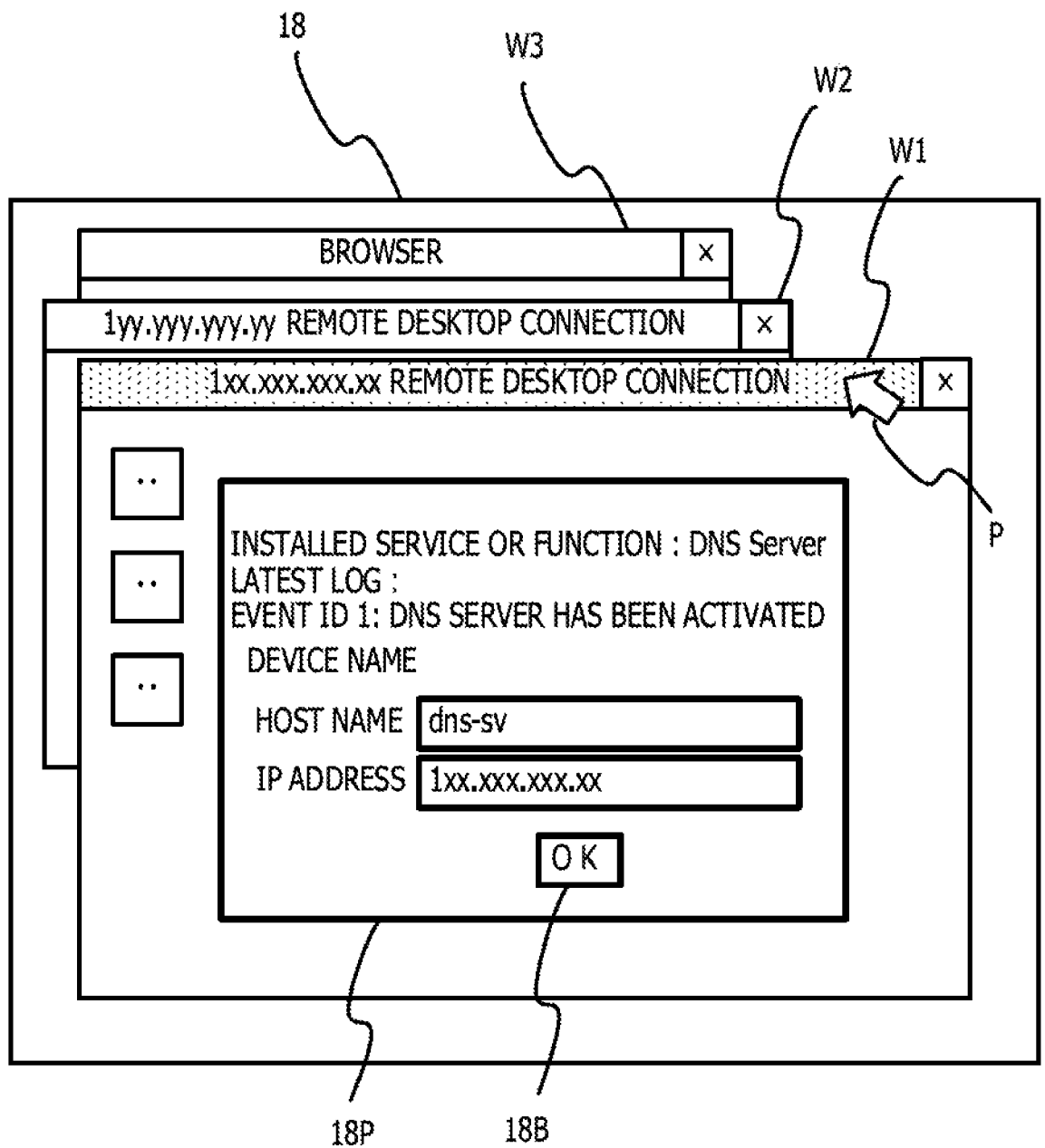
FIG. 4 is a diagram (second diagram) illustrating the display example of the display unit.

In view of this, when the terminal device 2 has received an operation on the remote desktop connection screen W again after a predetermined period of time has elapsed from a previous operation on the remote desktop connection screen W, the terminal device 2 displays a confirmation screen as illustrated in an example of FIG. 4.

This confirmation screen is hereinafter referred to as a pop-up 18P. The pop-up 18P is an example of a screen that requests an input of identification information or a screen that requests confirmation of intent to perform an operation.

When the terminal device 2 displays the pop-up 18P, the terminal device 2 may cause, for example, a speaker to produce an alert tone. This alert tone attracts the operator's attention. The operator's attention may be attracted by a method other than the alert tone. For example, the display control unit 13 of the terminal device 2 may control the operation-target remote desktop connection screen W to blink when displaying the pop-up 18P.

As illustrated in the example of FIG. 4, information on an installed service or function and the latest log is displayed on the pop-up 18P. The installed service or function indicates information on a service or function that is installed in the server 3 corresponding to the remote desktop connection screen W.

The latest log indicates the latest log information of the server 3 corresponding to the remote desktop connection screen W. The information on the installed service or function and the latest log may be acquired in such a manner that the terminal device 2 transmits a predetermined command to the server 3 and causes the server 3 to execute the command.

In the pop-up 18P, input fields corresponding to a host name and an IP address are provided, respectively. Each of the host name and the IP address is information that identifies the server 3.

Thus, the information input in each of the input fields is identification information. The pop-up 18P is provided with an OK button 18B. When the terminal device 2 has received an operation of depressing the OK button 18B after the identification information has been input in each of the input fields, the terminal device 2 recognizes the identification information input in each of the input fields.

The terminal device 2 compares the identification information of the server 3 corresponding to the remote desktop connection screen W with the input identification information. When the identification information of the server 3 matches the input identification information, it is determined that the input identification information is correct identification information.

The identification information of the server 3 corresponding to the remote desktop connection screen W may be acquired in such a manner that the terminal device 2 transmits a predetermined command to the server 3 and causes the server 3 to execute the command.

When it is determined that the input identification information is correct identification information, the terminal device 2 resumes receiving the operation on the remote desktop connection screen W. The display control unit 13 of the terminal device 2 hides the pop-up 18P displayed on the display unit 18.

When the identification information of the server 3 does not match the input identification information as a result of the comparison, it is determined that the input identification information is incorrect. In this case, the terminal device 2 does not receive the operation on the remote desktop connection screen W.

When the terminal device 2 has received the operation on the remote desktop connection screen W, operation information on the received operation is transmitted to the server 3 corresponding to the remote desktop connection screen W.

Therefore, when it is determined that the input identification information is incorrect, the terminal device 2 restricts execution of the processing of transmitting the operation information to the server 3 corresponding to the remote desktop connection screen W.

Thus, even if the operator has erroneously selected a remote desktop connection screen W that is different from the operation-target remote desktop connection screen W, the terminal device 2 does not receive the operation on the remote desktop connection screen W until the correct identification information is input. Accordingly, the erroneous operation on the remote desktop connection screen W is reduced.

Examples of Various Tables

FIG. 5 illustrates an example of a management table in which the screens displayed on the display unit 18 are managed. The management table is stored in the storage unit 16. The management table contains items of screen information, device information, operation time, screen position, and alert time.

The screen information is information that identifies the screen W. The screen W is also a window as described above. Thus, the screen information is also information that identifies the window. As illustrated in the example of FIG. 5, the screen information contains information indicating a current operation screen. The current operation screen is an operation-target screen which is a currently selected screen W.

The device information is information indicating the server 3 corresponding to the screen W that is indicated by the screen information. The device information may be "NULL". The screen W whose device information is "NULL" is a screen other than the remote desktop connection screen. For example, in the example of FIG. 5, a screen Wn is a screen other than the remote desktop connection screen, such as a browser or a mailer.

The operation time indicates a time when the screen W is operated last. The time management unit 12 manages the times when the respective screens W are operated last. When the operation-target screen is switched to a new screen W, the time management unit 12 stores a time when the screen is operated last as an operation time in a corresponding record of the management table. In the case of the current operation screen, the operation time is a current time.

The screen position indicates information on the position of the screen W in the display unit 18. In the embodiment, the screen position is assumed to be the coordinates of the screen W. For example, the screen position indicates the position of the screen W in an orthogonal two-axis coordinate system.

The alert time indicates a period of time from a time when the screen W is operated last (operation time) to a time when the pop-up 18P is displayed. In the embodiment, it is assumed that a plurality of alert times is provided. The alert time is an example of a reference.

FIG. 6 illustrates an example of a classification table indicating types assigned to respective alert times. The classification table contains items of type, alert time, and condition. In the example of FIG. 6, the alert time corresponding to type Z is infinity.

The condition corresponding to type Z is that "the operation-target screen is a screen other than the remote desktop connection screen". When the operation-target screen is a screen W (for example, a mailer screen) other than the remote desktop connection screen, the remote desktop connection function is not affected even if an erroneous operation is performed on the screen W.

Therefore, the alert time is set to infinity. That is, the pop-up 18P is not displayed on the screen W other than the remote desktop connection screen. The alert time in the case of type Z may be omitted.

The condition corresponding to type A is that "the operation is resumed on the same remote desktop connection screen". For example, it is assumed that the operation is performed on the remote desktop connection screen W1, then suspended, and then resumed on the remote desktop connection screen W1.

In this case, the operation is performed on the same remote desktop connection screen W1 before and after the operation is suspended. Therefore, the above-mentioned erroneous operation is relatively unlikely to occur. Thus, the alert time corresponding to type A is set relatively long. In the example of FIG. 6, the alert time corresponding to type A is set to "60 minutes".

The condition corresponding to type B is that "the operation is resumed on a different remote desktop connection screen or performed for the first time". For example, it is assumed that the operation is performed on the remote desktop connection screen W1, then suspended, and then resumed on the remote desktop connection screen W2.

In this case, the operation is performed on different remote desktop connection screens W before and after the operation is suspended. Therefore, the above-mentioned erroneous operation is more likely to occur in type B than in type A. Thus, the alert time corresponding to type B is set shorter than the alert time corresponding to type A. In the example of FIG. 6, the alert time corresponding to type B is set to "30 minutes".

The alert time corresponding to type B may be a reference time. For example, it is assumed that a case in which an operation is performed on the remote desktop connection screen W for the first time after the terminal device 2 has been activated is classified as type B corresponding to the reference alert time.

The condition corresponding to type C1 is that "the operation has been performed once on a screen other than the remote desktop connection screen within a period from the previous operation to the current operation". For example, it is assumed that the operation has been performed on the remote desktop connection screen W1 and then on a mailer screen W.

Further, it is assumed that the operation has been performed on the mailer screen W and then on the remote desktop connection screen W1 again. In this case, the operation has been performed on the screen W other than the remote desktop connection screen within a period between the previous operation and the current operation on the remote desktop connection screen W1.

The screen W other than the remote desktop connection screen is a screen W which does not use the remote desktop connection function. When the operation has been performed on the screen W within a period between the operations on the remote desktop connection screen W, the operator's attention is distracted.

Therefore, the alert time corresponding to type C1 is set shorter than the alert time corresponding to type B. In the example of FIG. 6, the alert time corresponding to type C1 is set to "10 minutes".

The condition corresponding to type C2 is that "the operation has been performed twice or more on a screen other than the remote desktop connection screen within a period from the previous operation to the current operation". For example, a case in which operations have been performed on a browser screen W and a mailer screen W within a period between the previous operation and the current operation on the remote desktop connection screen W1 is classified as type C2.

When the condition corresponds to type C2, the operator's attention may be distracted more than in the case of type C1. Therefore, the alert time corresponding to type C2 is set shorter than the alert time corresponding to type C1. In the example of FIG. 6, the alert time corresponding to type C2 is set to "5 minutes".

The alert time may be set shorter as the number of times the operation has been performed on the screen other than the remote desktop connection screen increases within a period from the previous operation on the remote desktop connection screen to the current operation on the remote desktop connection screen.

The alert time of each type is not limited to the period of time illustrated in the example of FIG. 6. For example, the alert time corresponding to type A may be set to "50 minutes" or "70 minutes".

<Example of Alert Time Selection>

FIG. 7 illustrates an example of alert time selection. The management table illustrated in the example of FIG. 7 indicates information on operations performed on the screens W displayed on the display unit 18 within a period from an operation time "2016/03/01 18:00" to an operation time "2016/03/01 18:02".

In the management table of FIG. 7, it is assumed that the screen W3 other than the remote desktop connection screen has been operated at "2016/03/01 18:00". This case corresponds to type Z, and hence the alert time of the management table is set to infinity.

Next, it is assumed that the remote desktop connection screen W2 has been operated for the first time at "2016/03/01 18:01". This case corresponds to type B, and hence the alert time of the management table is set to "30 minutes".

Next, it is assumed that the remote desktop connection screen W1 has been operated for the first time at "2016/03/01 18:02". This case corresponds to type B, and hence the alert time of the management table is set to "30 minutes".

The foregoing description is based on the information stored in the management table. Next, classification of the type of an operation performed at "2016/03/01 18:03" is described. It is assumed that none of the screens W has been operated within a period from "2016/03/01 18:02" to "2016/03/01 18:03".

When the remote desktop connection screen W1 has been operated at "2016/03/01 18:03", the operation has been resumed on the same remote desktop connection screen W1. Thus, this case corresponds to type A, and hence the alert time is set to "60 minutes".

When the remote desktop connection screen W2 has been operated at "2016/03/01 18:03", the operation has been resumed on a different remote desktop connection screen W. Thus, this case corresponds to type B, and hence the alert time is set to "30 minutes".

When a screen W other than the remote desktop connection screen has been operated at "2016/03/01 18:03", this case corresponds to type Z, and hence the alert time is set to infinity.

FIG. 8 illustrates another example of the alert time selection. In the example of FIG. 8, the information of the management table is different from the information of the management table in the example of FIG. 7. In the example of FIG. 8, information within a period from "2016/03/01 18:00" to "2016/03/01 18:03" is information recorded in the management table.

It is assumed that the remote desktop connection screen W1 has been operated at "2016/03/01 18:04".

In this case, the operation has been performed once on a screen W4 other than the remote desktop connection screen within a period between the operation performed on the remote desktop connection screen W1 at "18:02" and the operation performed on the remote desktop connection screen W1 at "18:04". This case corresponds to type C1, and hence the alert time is set to "10 minutes".

Further, it is assumed that the remote desktop connection screen W2 has been operated at "2016/03/01 18:04" in the example of FIG. 8.

In this case, the operation has been performed twice on the screens other than the remote desktop connection screen within a period between the operation performed on the remote desktop connection screen W2 at "18:00" and the operation performed on the remote desktop connection screen W2 at "18:04". That is, the operation has been performed on the screens W3 and W4 other than the remote desktop connection screen. This case corresponds to type C2, and hence the alert time is set to "5 minutes".

Flowcharts Illustrating Example of Flow of Processing of Embodiment

Next, an example of a flow of processing of the embodiment is described with reference to flowcharts illustrated in FIG. 9 and FIG. 10. It is assumed that the operator has performed an operation that uses the remote desktop connection function on the terminal device 2.

The terminal device 2 receives the operation. When the terminal device 2 has received the operation, the display control unit 13 performs control of displaying the remote desktop connection screen W on the display unit 18. With this control, the remote desktop connection screen W is displayed on the display unit 18 (Step S1).

By performing the operation on the remote desktop connection screen W, the remote desktop connection function is enabled for the server 3 corresponding to the remote desktop connection screen W.

A single remote desktop connection screen W may be displayed on the display unit 18. Alternatively, a plurality of remote desktop connection screens W may be displayed on the display unit 18. Further, a screen W other than the remote desktop connection screen may be displayed on the display unit 18.

When the operator has performed an operation on the remote desktop connection screen W by using the input unit 17 of the terminal device 2, the terminal device 2 receives the operation (Step S2). The input unit 17 is, for example, a mouse and a keyboard, and the terminal device 2 receives a mouse operation and a keyboard operation.

When the terminal device 2 has received the operation on the remote desktop connection screen W, the time management unit 12 acquires a current time (Step S3). For example, the time management unit 12 may have a clock function. In this case, the time management unit 12 acquires a current time based on the clock function.

The control unit 11 obtains information on the coordinates (coordinate information) where the operation is performed in the display unit 18 (Step S4). The control unit 11 identifies a screen W corresponding to the obtained coordinate information by referring to the management table stored in the storage unit 16 (Step S5). This screen W is an operation-target screen.

This screen W is hereinafter described as a remote desktop connection screen, but the identified screen W may be a screen other than the remote desktop connection screen.

When the remote desktop connection screen W is identified, the time management unit 12 stores the acquired current time as an item of the operation time corresponding to the remote desktop connection screen W in the management table stored in the storage unit 16. When time information has already been stored as the corresponding item, the time information of this item is updated to that of the acquired current time.

The control unit 11 determines whether the pop-up 18P is displayed on the remote desktop connection screen W (Step S6). The pop-up 18P is displayed on the display unit 18 after the alert time has elapsed from the previous operation time of the remote desktop connection screen W.

Thus, when the result of determination in Step S6 is NO, the alert time has not elapsed from the previous operation time of the remote desktop connection screen W. In this case, the control unit 11 performs processing of selecting the alert time from the classification table based on a transition between the operations on the screens W displayed on the terminal device 2 (Step S7).

The time management unit 12 determines whether the selected alert time has elapsed from the previous operation time of the operation-target remote desktop connection screen W (Step S8). When the result of determination in Step S8 is NO, the desktop connection function is enabled.

In this case, the control unit 11 performs control of transmitting, to the server 3 corresponding to the remote desktop connection screen W, operation information on the operation performed on the remote desktop connection screen W that is received by the terminal device 2. Based on this control, the communication unit 15 transmits the operation information to the server 3 (Step S9). Then, the processing returns to Step S1.

When the result of determination in Step S8 is YES, the processing proceeds to "A". The processing subsequent to "A" is described with reference to FIG. 10. The device information acquisition unit 14 acquires identification information that identifies the server 3 corresponding to the remote desktop connection screen W that is the operation-target screen (Step S10).

In the embodiment, the device information acquisition unit 14 controls the server 3 corresponding to the remote desktop connection screen W to execute a predetermined command. For example, the device information acquisition unit 14 transmits a command "ipconfig" to the server 3 and causes the server 3 to execute the command. In this manner, information on an IP address of the server 3 corresponding to the remote desktop connection screen W is acquired from the server 3.

In the embodiment, the host name as well as the IP address is included in the input fields. Therefore, the device information acquired by the device information acquisition unit 14 contains a host name as well. The device information may be, for example, the IP address alone.

When the device information acquisition unit 14 acquires the host name of the server 3 corresponding to the remote desktop connection screen W, the device information acquisition unit 14 controls the server 3 to execute a command "hostname". In this manner, the terminal device 2 acquires information on the host name from the server 3.

The terminal device 2 also acquires information on the installed service name or function and the latest log described above by causing the server 3 corresponding to the remote desktop connection screen W to execute a predetermined command.

The display control unit 13 displays the pop-up 18P on the operation-target remote desktop connection screen W (Step S11). Then, the control unit 11 disables operations other than the input operation on the pop-up 18P (Step S12).

This processing restricts transmission of operation information on the operation performed on the remote desktop connection screen W to the server 3 corresponding to the remote desktop connection screen W. In this case, the remote desktop connection function is disabled for the server 3 corresponding to the remote desktop connection screen W.

The control unit 11 performs control of producing an alert tone (Step S13). Then, the processing returns to Step S1 of FIG. 9 from "C". Next, a case in which the result of determination in Step S6 is YES is described.

When the result of determination in Step S6 is YES, the alert time has elapsed from the previous operation time of the operation-target remote desktop connection screen W. In this case, the processing proceeds to "B". The processing subsequent to "B" is described with reference to FIG. 10.

The control unit 11 determines whether the identification information is input to each of the input fields described above or the OK button 18B is depressed in the displayed pop-up 18P (Step S14).

Figure 9:
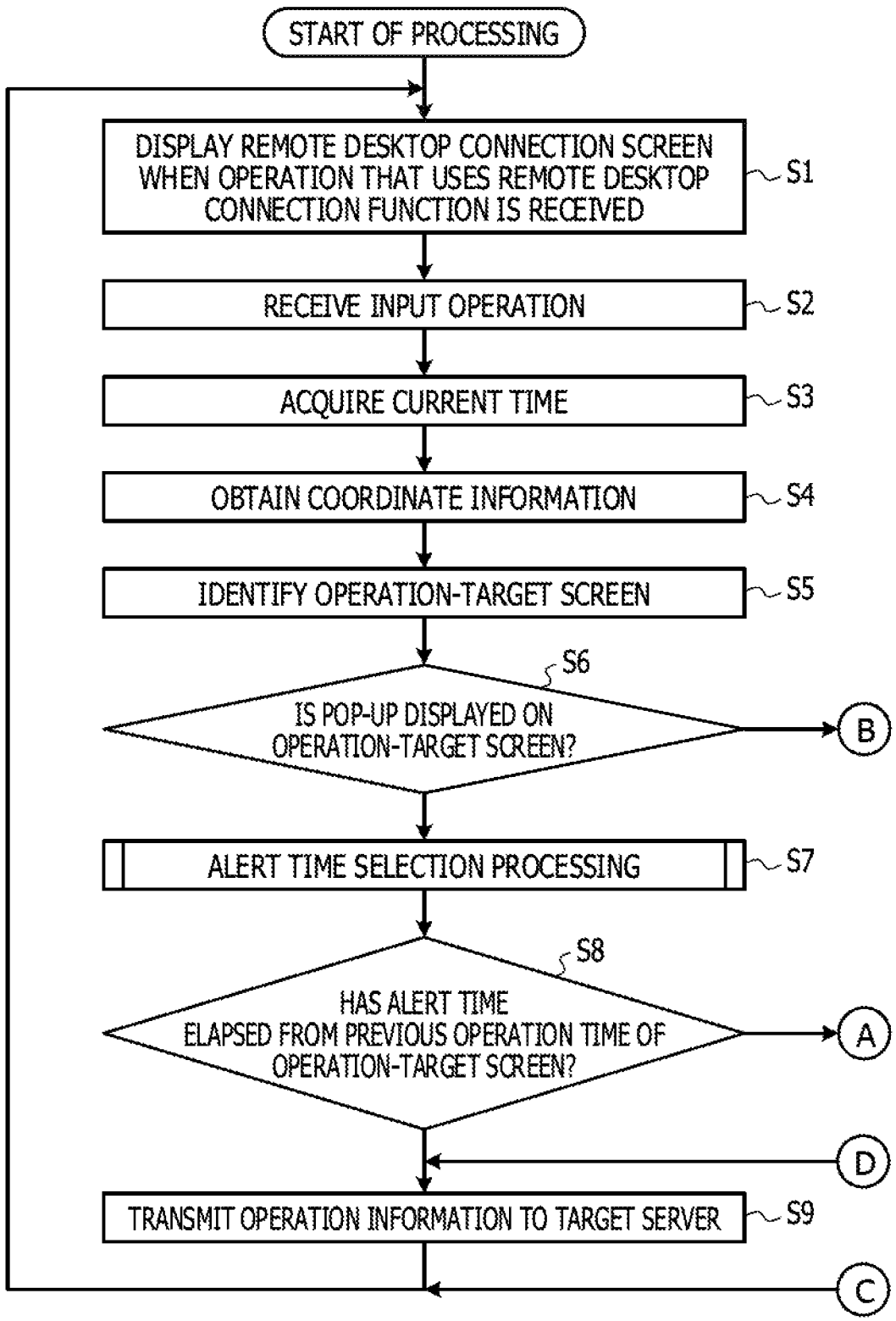
FIG. 9 is a flowchart (first flowchart) illustrating an example of a flow of processing of the embodiment.
Figure 10:
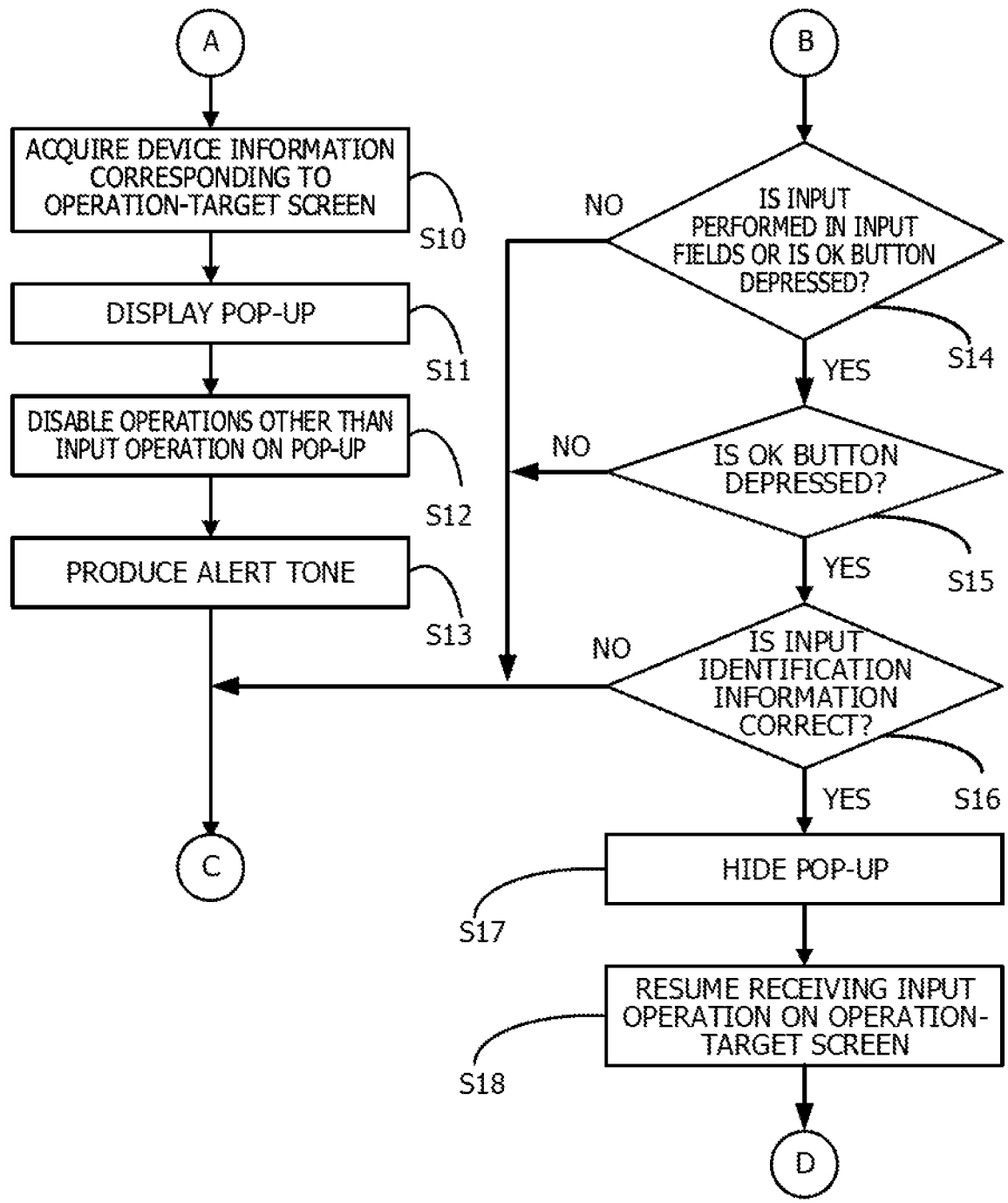
FIG. 10 is a flowchart (second flowchart) illustrating the example of the flow of the processing of the embodiment.

When the result of determination in Step S14 is NO, the processing returns to Step S1 of FIG. 9 from "C". In this case, the operation information is not transmitted to the server 3 corresponding to the remote desktop connection screen W on which the pop-up 18P is displayed.

The control unit 11 determines whether the OK button 18B is depressed (Step S15). When the result of determination in Step S15 is NO, the processing returns to Step S1 of FIG. 9 from "C". When the result of determination in Step S15 is YES, the control unit 11 determines whether the identification information (such as the IP address and the host name) input to each of the input fields is correct (Step S16).

When the device information acquired in Step S10 matches the input identification information, the control unit 11 determines that the input identification information is correct. For example, if the acquired device information is an IP address and the input identification information is also an IP address, the control unit 11 determines that the input identification information (IP address) is correct when both the IP addresses match each other.

When two items of host name and IP address are displayed in the input fields, the input identification information is a host name and an IP address. In this case, the device information acquisition unit 14 acquires the host name and the IP address from the server 3 corresponding to the remote desktop connection screen W.

Then, the control unit 11 determines that the input identification information is correct when the host name and the IP address input to the input fields match the acquired host name and the acquired IP address. When one or both of the host name and the IP address do not match one or both of the acquired host name and the acquired IP address, the control unit 11 determines that the input identification information is incorrect.

When the result of determination in Step S16 is NO, the processing returns to Step S1 of FIG. 9 from "C". When the result of determination in Step S16 is YES, the display control unit 13 hides the displayed pop-up 18P (Step S17). Then, the control unit 11 resumes receiving the input operation on the operation-target remote desktop connection screen W (Step S18).

Thus, the remote desktop connection function is enabled for the server 3 corresponding to the remote desktop connection screen W. In this case, the operation information on the remote desktop connection screen W that is received by the terminal device 2 is transmitted to the server 3.

Data Flow Diagrams Illustrating Example of Flow of Processing of Embodiment

Figure 11:
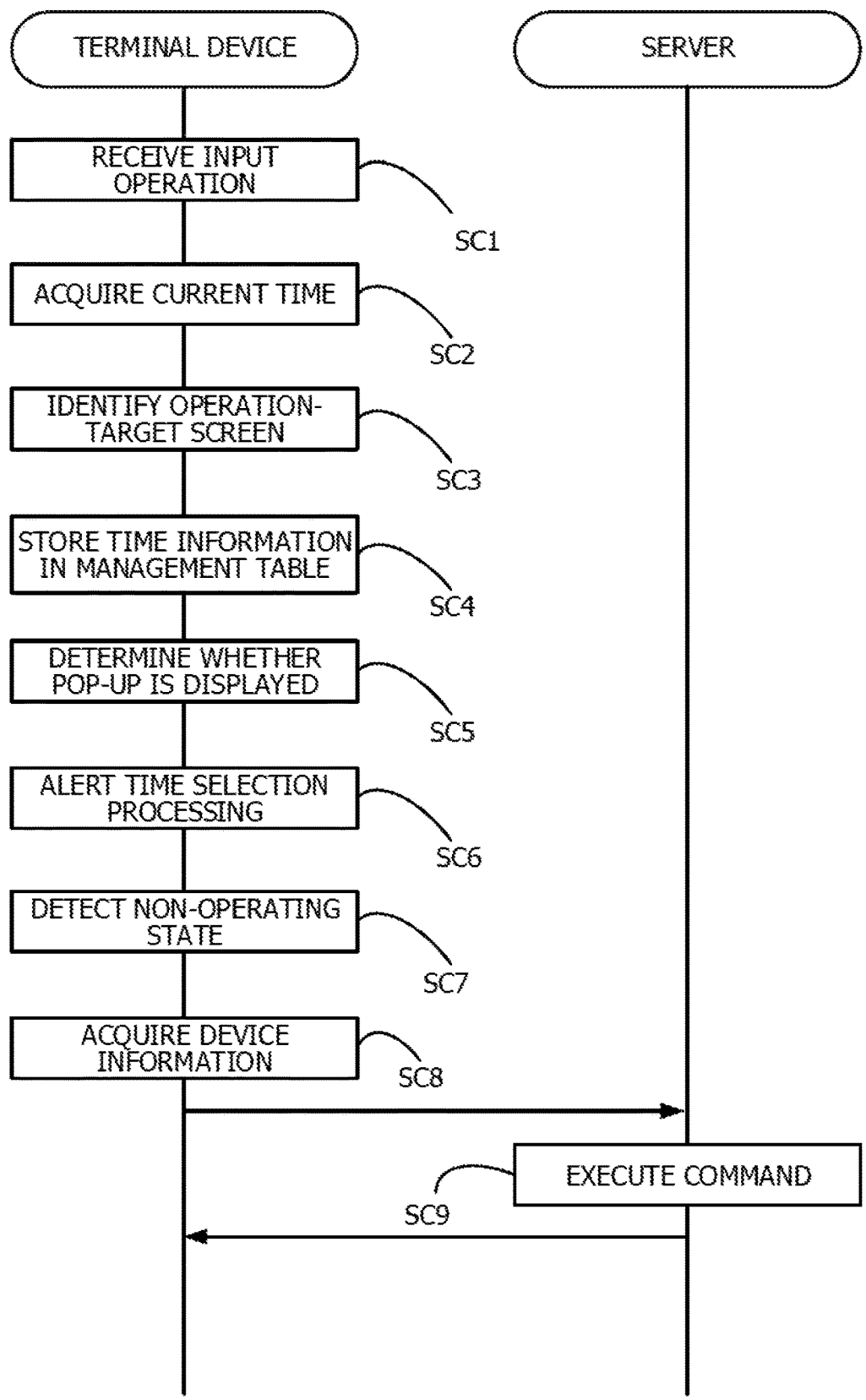
FIG. 11 is a data flow diagram (first diagram) illustrating the example of the flow of the processing of the embodiment.
Figure 12:
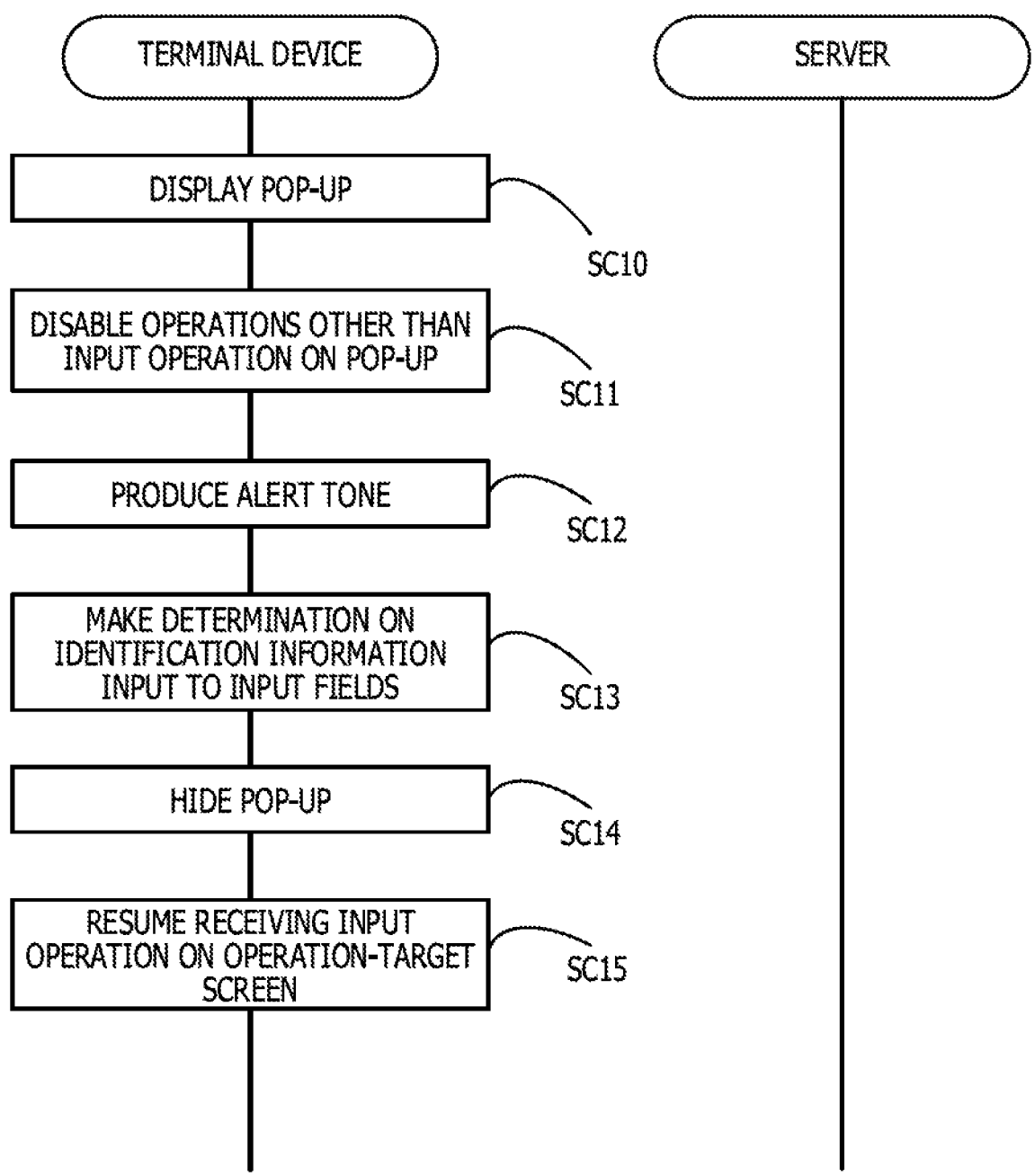
FIG. 12 is a data flow diagram (second diagram) illustrating the example of the flow of the processing of the embodiment.

Next, data flow diagrams of FIG. 11 and FIG. 12 are described. Processing similar to the processing described with reference to the flowcharts of FIG. 9 and FIG. 10 is briefly described. The terminal device 2 receives an input operation (Step SC1). The terminal device 2 acquires a current time (Step SC2) and identifies an operation-target remote desktop connection screen W (Step SC3).

The terminal device 2 stores the acquired current time as an item of the operation time corresponding to the remote desktop connection screen W in the management table stored in the storage unit 16 (Step SC4).

When the management table has a record of the server 3 corresponding to the operation-target remote desktop connection screen W, the time management unit 12 updates the information on the item of the operation time of the record to the current time.

When the management table has no record of the server 3 corresponding to the operation-target remote desktop connection screen W, the time management unit 12 newly adds a record of the server 3. Then, the time management unit 12 stores the information on the current time as an item of the operation time in the added record.

The terminal device 2 determines whether the pop-up is displayed (Step SC5) and performs alert time selection processing (Step SC6). The terminal device 2 detects a non-operating state of the operation-target remote desktop connection screen W (Step SC7). Therefore, the terminal device 2 detects an elapsed time (non-operating time) from the previous operation time of the remote desktop connection screen W.

The terminal device 2 acquires device information on the server 3 corresponding to the remote desktop connection screen W (Step SC8). Therefore, the terminal device 2 transmits data for executing a predetermined command (such as "ipconfig" and "hostname") to the server 3.

The server 3 corresponding to the remote desktop connection screen W executes the command in response to reception of the data (Step SC9). Thus, the server 3 transmits the device information (such as an IP address and a host name) to the terminal device 2. The processing of Step SC10 and other subsequent processing are described with reference to FIG. 12.

The terminal device 2 displays the pop-up 18P on the remote desktop connection screen W (Step SC10) and disables operations other than the input operation on the pop-up 18P (Step SC11).

The terminal device 2 produces an alert tone (Step SC12) and determines whether the identification information input to each of the input fields of the pop-up 18P is correct (Step SC13).

Then, the terminal device 2 hides the displayed pop-up 18P (Step SC14) and resumes receiving the input operation on the operation-target remote desktop connection screen W (Step SC15).

Example of Alert Time Selection Processing

Figure 13:
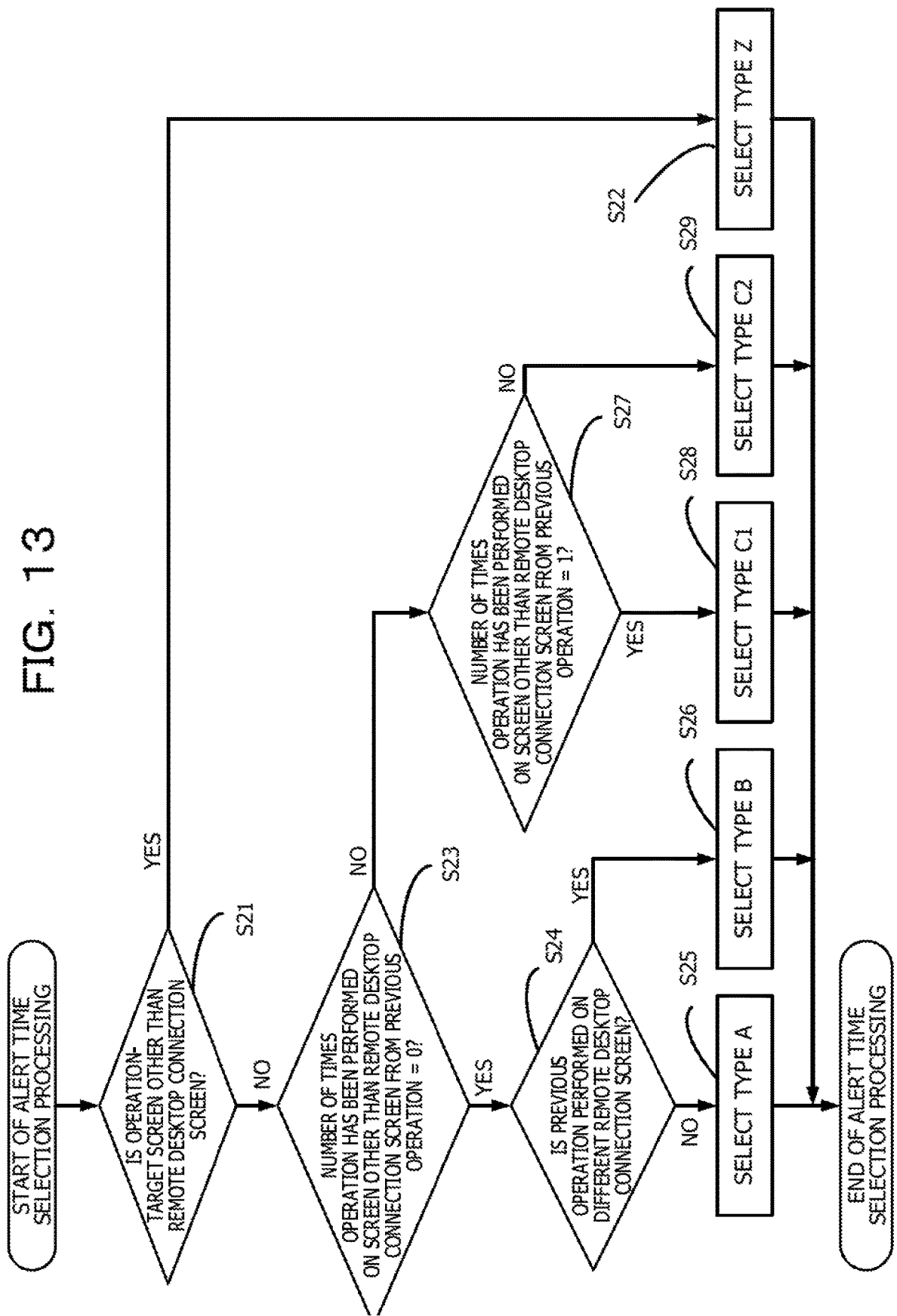
FIG. 13 is a flowchart illustrating an example of a flow of alert time selection processing.

Next, an example of the alert time selection processing of Step S7 in the flowchart of FIG. 9 is described with reference to FIG. 13. The control unit 11 determines whether the operation-target screen W is a screen other than the remote desktop connection screen (Step S21).

When the result of determination in Step S21 is YES, the operation-target screen W is, for example, a browser screen or a mailer screen. In this case, the control unit 11 selects type Z from the classification table (Step S22). When type Z is selected, the alert time is set to infinity.

When the result of determination in Step S21 is NO, the control unit 11 recognizes a transition between the operations on the respective screens W from the previous operation on the operation-target remote desktop connection screen W by referring to the management table stored in the storage unit 16.

The control unit 11 determines whether the number of times the operation has been performed on the screen W other than the remote desktop connection screen is "0" within a period from the previous operation on the operation-target remote desktop connection screen W to the current operation on the operation-target remote desktop connection screen W (Step S23).

When the result of determination in Step S23 is YES, the control unit 11 determines whether the previously operated remote desktop connection screen W is a remote desktop connection screen that is different from the current operation-target remote desktop connection screen W (Step S24).

When the result of determination in Step S24 is NO, the previously operated remote desktop connection screen W is the same as the current operation-target remote desktop connection screen W. Thus, the control unit 11 selects type A from the classification table (Step S25).

When the result of determination in Step S24 is YES, the previously operated remote desktop connection screen W is different from the current operation-target remote desktop connection screen W. Thus, the control unit 11 selects type B from the classification table (Step S26).

When the result of determination in Step S23 is NO, the control unit 11 determines whether the number of times the operation has been performed on the screen W other than the remote desktop connection screen is "1" within a period from the previous operation on the operation-target remote desktop connection screen W to the current operation on the operation-target remote desktop connection screen W (Step S27).

When the result of determination in Step S27 is YES, the control unit 11 selects type C1 from the classification table (Step S28).

When the result of determination in Step S27 is NO, the number of times the operation has been performed on the screen W other than the remote desktop connection screen is two or more within a period from the previous operation on the operation-target remote desktop connection screen W to the current operation on the operation-target remote desktop connection screen W. In this case, the control unit 11 selects type C2 from the classification table (Step S29).

In the manner as described above, the control unit 11 selects the alert time. The control unit 11 records the selected alert time in the management table stored in the storage unit 16.

Example of Hardware Configuration of Terminal Device

Figure 14:
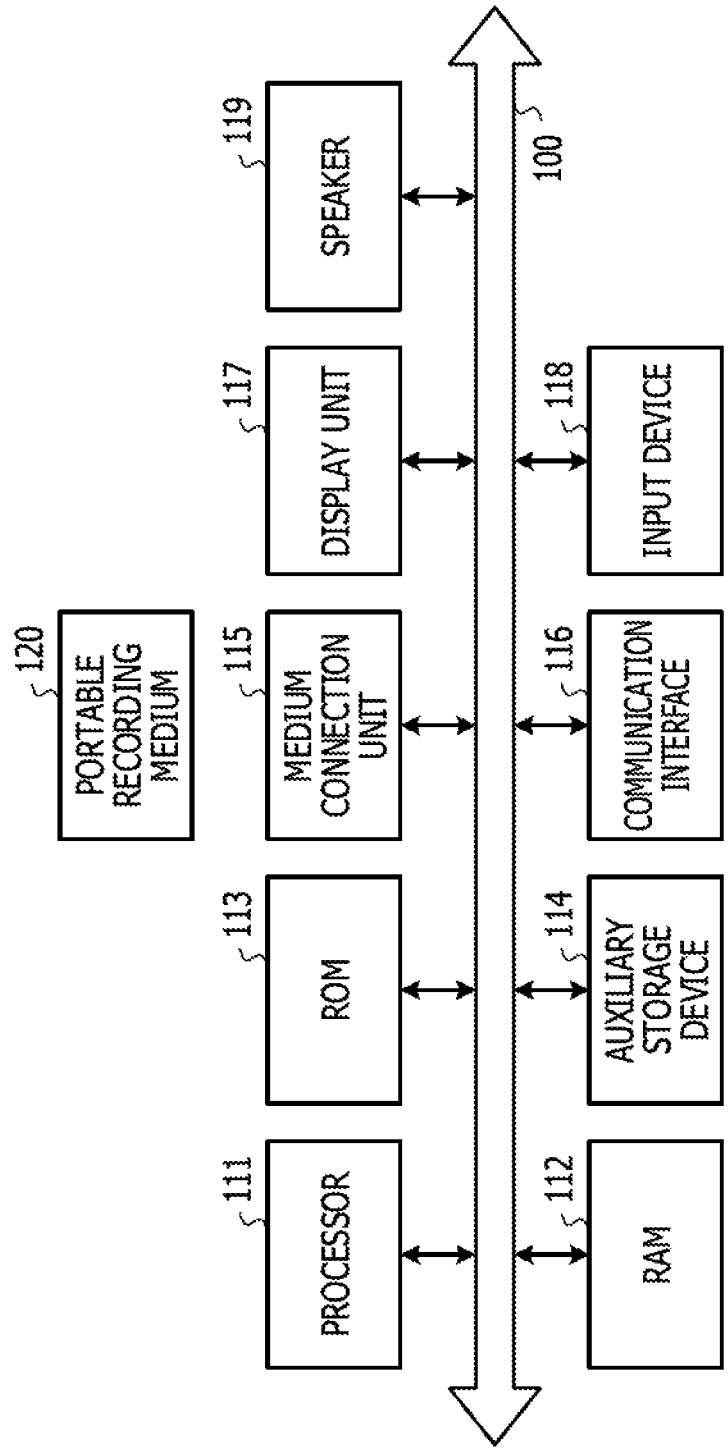
FIG. 14 is a diagram illustrating an example of the hardware configuration of the terminal device.

Next, an example of the hardware configuration of the terminal device 2 is described with reference to an example of FIG. 14. As illustrated in the example of FIG. 14, a processor 111, a random access memory (RAM) 112, and a read only memory (ROM) 113 are connected to a bus 100. Further, an auxiliary storage device 114, a medium connection unit 115, a communication interface 116, a display 117, an input device 118, and a speaker 119 are connected to the bus 100.

The processor 111 executes a program loaded on the RAM 112. As the program to be executed, a control program for performing the processing of the embodiment may be applied.

The ROM 113 is a non-volatile storage device configured to store the program to be loaded on the RAM 112. The auxiliary storage device 114 is a storage device configured to store various kinds of information, and for example, a hard disk drive or a semiconductor memory may be applied.

The medium connection unit 115 is provided so as to be connectable to a portable recording medium 120.

The display 117 is a display device. The input device 118 is, for example, a mouse and a keyboard. The display 117 and the input device 118 may be an integrated touch panel display. The speaker 119 is a speaker configured to produce the alert tone described above.

As the portable recording medium 120, a portable memory (for example, a semiconductor memory), an optical disc (for example, a compact disc (CD) or a digital versatile disc (DVD)), or the like may be applied. The control program for performing the processing of the embodiment may be recorded in the portable recording medium 120.

The communication unit 15 described above may be implemented by the communication interface 116. The storage unit 16 may be implemented by the RAM 112, the auxiliary storage device 114, and the like. The input unit 17 may be implemented by the input device 118. The display unit 18 may be implemented by the display 117.

The control unit 11, the time management unit 12, the display control unit 13, and the device information acquisition unit 14 may be implemented in such a manner that the processor 111 executes a given control program.

The RAM 112, the ROM 113, the auxiliary storage device 114, and the portable recording medium 120 are examples of a computer-readable tangible storage medium. Those tangible storage media are not transient media such as a signal carrier wave.

<Others>

This embodiment is not limited to the embodiment described above, and various configurations or embodiments may be employed without departing from the gist of this embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable storage medium storing a control program that causes a terminal device to execute a process, the terminal device being coupled to a plurality of information processing devices, the process comprising:
   displaying a plurality of operation screens of the plurality of information processing devices on a display;
   detecting a first operation on a first operation screen among the plurality of operation screens;
   when the first operation screen where the first operation is detected and a specified operation screen where a previous operation is detected are same operation screen,
      determining whether an elapsed time after a timing of the previous operation has exceeded a first reference time by referring to a storage unit that stores the timing of the previous operation,
      transmitting operation information corresponding to the first operation when it is determined that the elapsed time has not exceeded the first reference time, and
      when it is determined that the elapsed time has exceeded the first reference time, displaying, on the display, a screen that requests an input of identification information that identifies an operation-target information processing device without executing the transmitting; and
   when the first operation screen where the first operation is detected and the specified operation screen where the previous operation is detected are different operation screens,
      determining whether the elapsed time after the timing of the previous operation of the first operation screen has exceeded a second reference time which is shorter than the first reference time by referring to a storage unit that stores the timing of the previous operation,
      transmitting operation information corresponding to the first operation when it is determined that the elapsed time has not exceeded the second reference time, and
      when it is determined that the elapsed time has exceeded the second reference time, displaying, on the display, a screen that requests an input of identification information that identifies an operation-target information processing device without executing the transmitting.

2. The non-transitory computer-readable storage medium according to claim 1, wherein the process comprises:
   determining, in response to reception of an input of identification information on the screen that requests an input of identification information, whether the input identification information matches identification information that identifies the information processing device corresponding to the operation screen; and
   enabling the operation on the operation screen when it is determined that the input identification information matches the identification information that identifies the information processing device corresponding to the first operation screen.

3. The non-transitory computer-readable storage medium according to claim 2, wherein the process comprises:
   disabling an operation on the first operation screen other than an operation on the screen that requests an input of identification information when it is determined that the input identification information does not match the identification information that identifies the information processing device corresponding to the first operation screen.

4. The non-transitory computer-readable storage medium according to claim 1, wherein the process comprises:
   displaying a plurality of operation screens corresponding to each of a plurality of information processing devices, including the information processing device, on a display; and
   identifying, as the operation screen on which the operation is detected, an operation screen selected from among the plurality of operation screens.

5. The non-transitory computer-readable storage medium according to claim 4, wherein
   a plurality of different reference times are set for each of the plurality of operation screens.

6. The non-transitory computer-readable storage medium according to claim 4, wherein:
   a reference time to be applied to a specified operation screen, included in the plurality of operation screens, is changed in accordance with whether or not an operation on a screen different from the plurality of operation screens is detected during a period from a timing of a previous operation of the specified operation screen to a timing when an operation of the specified operation screen is detected.

7. The non-transitory computer-readable storage medium according to claim 4, wherein:
a reference time to be applied to a specified operation screen, included in the plurality of operation screens, is changed in accordance with whether or not an operation on an operation screen different from the specified operation screen is detected during a period from a timing of a previous operation of the specified operation screen to a timing when an operation of the specified operation screen is detected.

8. The non-transitory computer-readable storage medium according to claim 4, wherein:
when an operation on an operation screen different from the specified operation screen is detected, the reference time to be applied to a specified operation screen, included in the plurality of operation screens, is changed in accordance with number of times that the operation on the operation screen different from the specified operation screen is detected.

9. A non-transitory computer-readable storage medium storing a control program that causes a terminal device to execute a process, the terminal device being coupled to a plurality of information processing devices, the process comprising:
displaying a plurality of operation screens of the plurality of information processing devices on a display;
detecting a first operation on a first operation screen among the plurality of operation screens;
when the first operation screen where the first operation is detected and a specified operation screen where a previous operation is detected are same operation screen,
determining whether an elapsed time after a timing of the previous operation has exceeded a first reference time by referring to a storage unit that stores the timing of the previous operation,
transmitting operation information corresponding to the first operation when it is determined that the elapsed time has not exceeded the first reference time; and
when it is determined that the elapsed time has exceeded the first reference time, displaying, on the display, a screen that requests a confirmation of intent to perform the operation on the operation screen; and
when the first operation screen where the first operation is detected and the specified operation screen where the previous operation is detected are different operation screens,
determining whether the elapsed time after the timing of the previous operation has exceeded a second reference time which is shorter than the first reference time by referring to a storage unit that stores the timing of the previous operation,
transmitting operation information corresponding to the first operation when it is determined that the elapsed time has not exceeded the second reference time; and
when it is determined that the elapsed time has exceeded the second reference time, displaying, on the display, a screen that requests a confirmation of intent to perform the operation on the operation screen.

10. A terminal device coupled to a plurality of information processing devices, the terminal device comprising:
a memory that stores a first reference time and a second reference time; and
a processor coupled to the memory and the processor configured to:
displaying a plurality of operation screens of the plurality of information processing devices on a display;
detecting a first operation on a first operation screen among the plurality of operation screens;
when the first operation screen where the first operation is detected and a specified operation screen where a previous operation is detected are same operation screen,
determining whether an elapsed time after a timing of the previous operation has exceeded a first reference time by referring to a storage unit that stores the timing of a previous operation,
transmitting operation information corresponding to the first operation when it is determined that the elapsed time has not exceeded the first reference time, and
when it is determined that the elapsed time has exceeded the first reference time, displaying, on the display, a screen that requests an input of identification information that identifies an operation-target information processing device without executing the transmitting; and
when the first operation screen where the first operation is detected and the specified operation screen where the previous operation is detected are different operation screens,
determining whether the elapsed time after the timing of the previous operation has exceeded a second reference time which is shorter than the first reference time by referring to a storage unit that stores the timing of the previous operation,
transmitting operation information corresponding to the first operation when it is determined that the elapsed time has not exceeded the first reference time or the second reference time, and
when it is determined that the elapsed time has exceeded the second reference time, displaying, on the display, a screen that requests an input of identification information that identifies an operation-target information processing device without executing the transmitting.

* * * * *